(12) United States Patent
Foegelle

(10) Patent No.: US 10,542,498 B2
(45) Date of Patent: *Jan. 21, 2020

(54) SYSTEM AND METHOD FOR POWER CONTROL OF AN OVER-THE-AIR RF ENVIRONMENT EMULATOR

(71) Applicant: ETS-Lindgren Inc., Cedar Park, TX (US)

(72) Inventor: Michael David Foegelle, Cedar Park, TX (US)

(73) Assignee: ETS-Lindgren, Inc., Cedar Park, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/950,256

(22) Filed: Apr. 11, 2018

(65) Prior Publication Data

US 2018/0317179 A1 Nov. 1, 2018

Related U.S. Application Data

(60) Provisional application No. 62/492,637, filed on May 1, 2017.

(51) Int. Cl.
*H04W 52/04* (2009.01)
*H04B 17/29* (2015.01)
(Continued)

(52) U.S. Cl.
CPC .......... *H04W 52/04* (2013.01); *H04B 17/13* (2015.01); *H04B 17/29* (2015.01); *H04B 17/3912* (2015.01)

(58) Field of Classification Search
CPC ...... H04B 17/21; H04B 17/13; H04B 17/102; H04B 17/3912; H04B 17/11; H04B 1/0475

See application file for complete search history.

(56) References Cited

U.S. PATENT DOCUMENTS

2005/0245213 A1* 11/2005 Hirano .................. H03F 1/0205
455/127.1
2012/0098713 A1* 4/2012 Mow .................. H04B 17/0087
343/703
2016/0344490 A1 11/2016 Foegelle

OTHER PUBLICATIONS

Test Plan for 2x2 Downlink MIMO and Transmit Diversity Over-the-Air Performance, 3GPP Draft; CTIA MIMO OTA Test Plan VI 0, 3rd Generation Partnership Project (3GPP), Mobile Competence Centre; 650, Route Des Lucioles; F-06921 Sophia-Antipolis Cedex; France, dated Sep. 6, 2015 (Sep. 6, 2015), XP051043499, Retrieved from the Internet: URL:http://www.3gpp.org/ftp/Meetings_3GPP_SYNC/RAN/LSin on Sep. 6, 2015; Consisting of 76 pages.

(Continued)

*Primary Examiner* — Sung S Ahn

(74) *Attorney, Agent, or Firm* — Christopher & Weisberg, P.A.

(57) ABSTRACT

Methods, tests systems and computers for controlling power delivered to a test volume are provided. According to one aspect, an electromagnetic test system has at least one operational path having a channel emulator output, an amplifier, an attenuator and an antenna. A method includes, for a given desired output power level, C, setting a channel emulator output power to a power level B, and setting the attenuator to a setting A, such that C is a function of B and A. In such embodiments, the attenuation A is calculated based on an upper limit output power of the channel emulator and the desired output power C.

21 Claims, 12 Drawing Sheets

(51) Int. Cl.
*H04B 17/13* (2015.01)
*H04B 17/391* (2015.01)

(56) References Cited

OTHER PUBLICATIONS

Extended European Search Report dated Oct. 15, 2018 for European Application No. 18167797.2, filed on Apr. 17, 2018; Consisting of 8 pages.

* cited by examiner

SYSTEM AND METHOD FOR POWER CONTROL OF AN OVER-THE-AIR RF ENVIRONMENT EMULATOR

FIELD

This disclosure relates to electromagnetic measurement systems, and in particular to an improved system and method for power control of an over-the-air radio frequency (RF) environment emulator.

INTRODUCTION

U.S. Pat. No. 8,331,869 B2 describes systems and methods for over-the-air performance testing of wireless devices with multiple antennas. This class of system, referred to as a boundary array system, reproduces a radiated near-field environment that appears to the device in the test volume as though it originated in the far field and had the multipath characteristics of a chosen emulated environment. The device under test (DUT) within the test volume is typically isolated from the real world by an RF absorber lined anechoic chamber to produce a free-space environment, and then an array of antennas is used to reproduce the RF boundary condition and provide the directional characteristics around the DUT inherent in the chosen spatial channel model to be emulated.

FIG. 1 is a typical multiple input multiple output (MIMO) boundary array configuration 10 for a test of a device under test (DUT) 12, showing boundary array antennas 14 in an anechoic chamber 16 with a wireless communication tester 18 connected through spatial channel emulators 20A and 20B, referred to collectively herein as channel emulators 20, and amplifiers 22. Splitters 24 may be interposed between the wireless communication tester 18 and the spatial channel emulator 20. Some configurations require multiple individual channel emulators 20 synchronized together to produce sufficient output channels to drive all of the antenna elements in the chamber. The test configuration of FIG. 1 is typically used to evaluate the receiver performance of DUT 12. When the DUT 12 is a cellular phone, for example, the test configuration of FIG. 1 may be used to evaluate the downlink signal from the base station to the mobile phone. For simplicity, this document will refer to the DUT receiver test configuration as the downlink, and the DUT transmit test configuration as the uplink. The configuration of FIG. 1 is uni-directional for simplicity. Bi-directional systems are also employed.

The device under test (DUT) 12 is positioned on a positioner, such as a turntable, within a test volume of the anechoic chamber 16 that is isolated from the environment exterior to the anechoic chamber 16 by RF absorber lined walls, floor and ceiling. The array of antennas 14 radiate electromagnetic energy (radio waves) toward the DUT 12 in a variety of directions. The radiated signals from each of the antennas 14 have various impairments (delay spread, Doppler, interference, etc.) applied through spatial channel emulators 20 to simulate multipath fading in a real world environment.

The various impairments are introduced into signals received from the wireless communication tester 18 by one or more spatial channel emulators 20 that digitize the received signals. The digitized received signals are delayed and weighted in amplitude by the spatial channel emulators 20. More particularly, the spatial channel emulators 20 may add multipath delay, delay spread, fading, interference, and other impairments common in typical radiated communication paths, and then converts the result to analog signals and up-converts the result to a radio frequency, RF. Thus, each output of the spatial channel emulators 20 may be the sum of multiple replicas of the input signal delayed and weighted according to a channel model definition, and will vary in time based on a motion definition that models relative motion of the DUT 12 or an intervening reflector. Doppler frequency shift may also be introduced arising from the relative motion. Interference may also be introduced by adding additive white Gaussian noise (AWGN) or other noise as well as by injecting specific interfering signals. The full panoply of channel effects emulated by the channel emulator are referred to herein collectively as impairments. Note that while the description above reflects the most common way to produce spatial channel emulation today, other mechanisms exist to introduce similar/equivalent impairments, including purely analog means. Nothing herein should be construed to limit the possible design of the spatial channel emulator.

In a typical configuration, the number of inputs to the spatial channel emulators 20 may be different from the number of outputs of the spatial channel emulator 20. Splitters 24 may be interposed between the wireless communication tester 18 and the spatial channel emulators 20. Each output of the spatial channel emulators 20 is amplified by a power amplifier 22 and directed on a path, typically provided by cables, to an antenna 14. The spatial channel emulators 20 emulate a plurality of channels, each channel being associated with a different one of the antennas 14.

Amplification is required between the spatial channel emulators 20 and the antennas 14 in order to produce sufficient radiated power to be received by the DUT 12 on the downlink and to amplify the weak signals received from the DUT 12 to be well above the receiver sensitivity of the channel emulator 20 on the uplink. The wireless communication tester 18 emulates an end of a radio link opposite the DUT 12. The uplink is the path of signal propagation from the DUT 12 to the wireless communication tester 18 (these paths not being shown in FIG. 1).

The wireless communication tester generates signals according to a communication protocol of the DUT. For example, the wireless communication tester 18 may generate transmit signals that are formatted for long term evolution (LTE) signaling, and may receive signals from the DUT that are also formatted for LTE signaling. Other communication protocols, such as Wi-Fi, or the 3GPP 5G New Radio (NR) may be employed by the wireless communication tester 18. Also shown is a communication antenna 26 coupled to a low noise amplifier (LNA) 28 which is connected to the wireless communication tester 18. The purpose of the communication antenna 26 is to provide an alternate, un-faded and potentially low loss communication path between the DUT and the communication tester for signals that are unrelated to the metric being tested on the DUT (e.g. closed loop feedback of a digital error rate during a receiver sensitivity test) in order to maintain the full communication link.

The test automation computer 30 controls the signal power level in the test volume through settings on the communication tester and channel emulator. The output level of the communication tester 18 relative to the input reference level setting of the channel emulator 20 determines the signal level digitized by the channel emulator 20 and thereby impacts the net output power. If the power level input to the channel emulator 20 is half of the reference level setting, the output power will also be half of the output level setting. Normally the goal is to keep the average input power at the reference level setting.

Thus, the spatial channel emulation component is typically carried out by an RF channel emulator 20 that down converts and digitizes incoming signals, runs the results through digital signal processing to add multipath delay, delay spread, fading, interference, and other impairments common in typical radiated communication paths, and then converts the result back to analog signals and up-converts the result to the original RF frequency range. While the references herein to power generally refer to the average power of the signal, it should be noted that as a result of the impairments applied to the communication signal, the peak-to-average ratio (PAR) and overall dynamic range of the resulting faded signal is much larger than that of the input signal. Thus, the linearity of the output signal generator of the channel emulator, as well as any subsequent system components, is desirable. Likewise, the signal to noise ratio of the resulting faded signal will vary in time and frequency to values that are potentially very near the signal generator noise floor.

As mentioned, amplification 22 is required between the channel emulation 20 and boundary array antennas 14 in order to produce sufficient radiated power to be received by the DUT 12 on the downlink and to amplify the weak signals received from the DUT 12 to be well above the receiver sensitivity of the channel emulator 20 on the uplink. At the other end of the channel emulator 20, the wireless communication tester 18 or reference radio appropriate to the given wireless technology is used to emulate the other end of the wireless link.

For the downlink (receiver test) configuration of the boundary array, power amplification is required to overcome the net path loss of the chamber and provide a faded signal level that is high enough above the receiver noise floor of the DUT to ensure communication at the chosen modulation and coding scheme (MCS).

For signal-to-interference ratio (SIR) testing, where both the signal and interference are introduced into the OTA environment by the test equipment, the amplifiers need to have a high enough output power that for a desired SIR the interference-to-noise ratio (INR) at the DUT 12 is high enough that the signal-to-interference-plus-noise ratio (SINR) seen by the receiver of the DUT 12 is approximately equal to the desired SIR. In other words, the interference plus noise is approximately equal to the interference only because the noise is much less than the interference and thus relatively near zero.

Ideally, the gain of an amplifier 22 is chosen such that the maximum output power of an output of the channel emulator 20 corresponds to the maximum usable output of the power amplifier 22. This is not always possible because amplifiers cannot be made perfectly flat, and because different models of channel emulators from different manufacturers have different maximum output levels.

Another desired mode of operation of a boundary array system involves measuring receiver sensitivity performance of the DUT 12. In this case, the power in the test volume is lowered by reducing the output powers of the outputs of the channel emulators 20 until a target error rate or throughput is reached. This target corresponds to a particular signal-to-noise ratio (SNR) at the receiver of the DUT 12, where the noise consists of the thermal noise of the DUT receiver plus any self-interference produced by other components of the DUT 12, commonly referred to as the platform noise. For such a test, the signal level seen at the DUT 12 will generally be much lower than that required for the SINR at the DUT receiver to be about equal to the applied SIR. Thus, the maximum output power required from amplifier 22 will generally be lower in this usage case. Likewise, the required gain of the amplifier 22 is really only that necessary to overcome the over-the-air (OTA) path loss of the test system from the channel emulators 20 to the DUT 12 in order to put the channel emulator 20 in a similar range of operation as would be used to measure the receiver sensitivity of the DUT 12 in a conducted configuration.

Unfortunately, when trying to build a system to meet the requirements of the SIR based test, the platform noise-limited case suffers from system level noise introduced by the test system itself. While a real amplifier introduces some of its own noise into the test system as well, this system noise problem would exist even if a perfect amplifier (a perfect gain source with no inherent noise figure) could be used. Any signal generator, including the outputs of a channel emulator, has its own output noise floor and thus the output has an associated SNR. Since the sensitivity search is performed by lowering the output level of the channel emulators 20, the SNR at the output decreases as the signal level decreases.

Normally, as in the example of the conducted test, the output noise of the channel emulator is designed to be much lower than the input noise of the receiver of the DUT 12 such that it has a negligible impact on the detected receiver sensitivity. However, when the gain of the amplifier 22 is higher than the path loss to be compensated, the signal level at the channel emulator output must be lowered much further to reach the desired receiver sensitivity level. Thus, the SNR at the source is lower than in the ideal case, and both the signal and noise are amplified and injected into the test volume. The higher the gain of the amplifier 22, the higher the system noise level in the test volume, regardless of any other factors. As the system noise level approaches a fraction of the level of the platform noise, it becomes a significant component of the SNR at the receiver of the DUT 12 and alters the measured receiver sensitivity level.

Unfortunately, even if the SIR usage case is ignored and one only attempts to choose a gain suitable to overcome the system path loss for the platform noise limited test case, there is no simple solution. The path loss of cables and the free-space path loss generally increase as a function of frequency, while antennas and other components are more variable. Tuning a broadband amplifier to compensate for all of these factors and provide a constant net gain to the center of the test volume could be nearly impossible.

SUMMARY

In order to overcome limitations of known methods, a dynamic power control function is introduced to the test system that either reduces the internal gain of each amplifier 22 in the system with a negligible impact on the amplifier noise figure, or adds attenuation after each amplifier 22 to provide output power control, all while keeping the output signal of the channel emulator 20 near its maximum SNR. In some cases, the output power control of the amplifier output would be sufficient to control the entire desired range of power levels used for the test, but various factors of currently available components make that unlikely. Thus, an option to perform a hybrid power control is desired where both the output gain/attenuation is controlled and the signal level of the channel emulator 20 is varied over a narrow range of operation at a high SNR. A software and/or embedded firmware algorithm is used to combine the various power control features into one seamless linear power control range, as well as preventing damage due to various switching conditions occurring during the normal operation of the system.

Thus, systems and methods of controlling power in an electromagnetic test system are provided, where the electromagnetic test system has at least one operational path having a channel emulator output, either a variable gain amplifier (VGA) or a fixed gain amplifier with a variable attenuator at the output, and an antenna. A control unit may be provided to enable setting of the output power of the channel emulator output and setting of the gain of the amplifier or attenuation of the attenuator. In some embodiments, the gain control is integral to the construction of the amplifier, such that setting the attenuation via the gain control involves adjusting the gain of the amplifier. In some embodiments, the attenuation is set by setting an attenuator that follows the amplifier.

In some embodiments, the setting of the output power of the channel emulator output and setting of the attenuation of the attenuator is such as to achieve a resultant desired power in the test volume of the electromagnetic test system. In some embodiments, a setting of the attenuation A is calculated to reduce a range over which the channel emulator output power is adjusted to achieve the desired output level. More particularly, in some embodiments, the setting of the attenuator may be considered a coarse power adjustment whereas the setting of the channel emulator output power may be considered a fine power adjustment. Moreover, a sequence in which the settings of the attenuator and channel emulator are made depends on whether a desired power setting is less than a current power setting.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
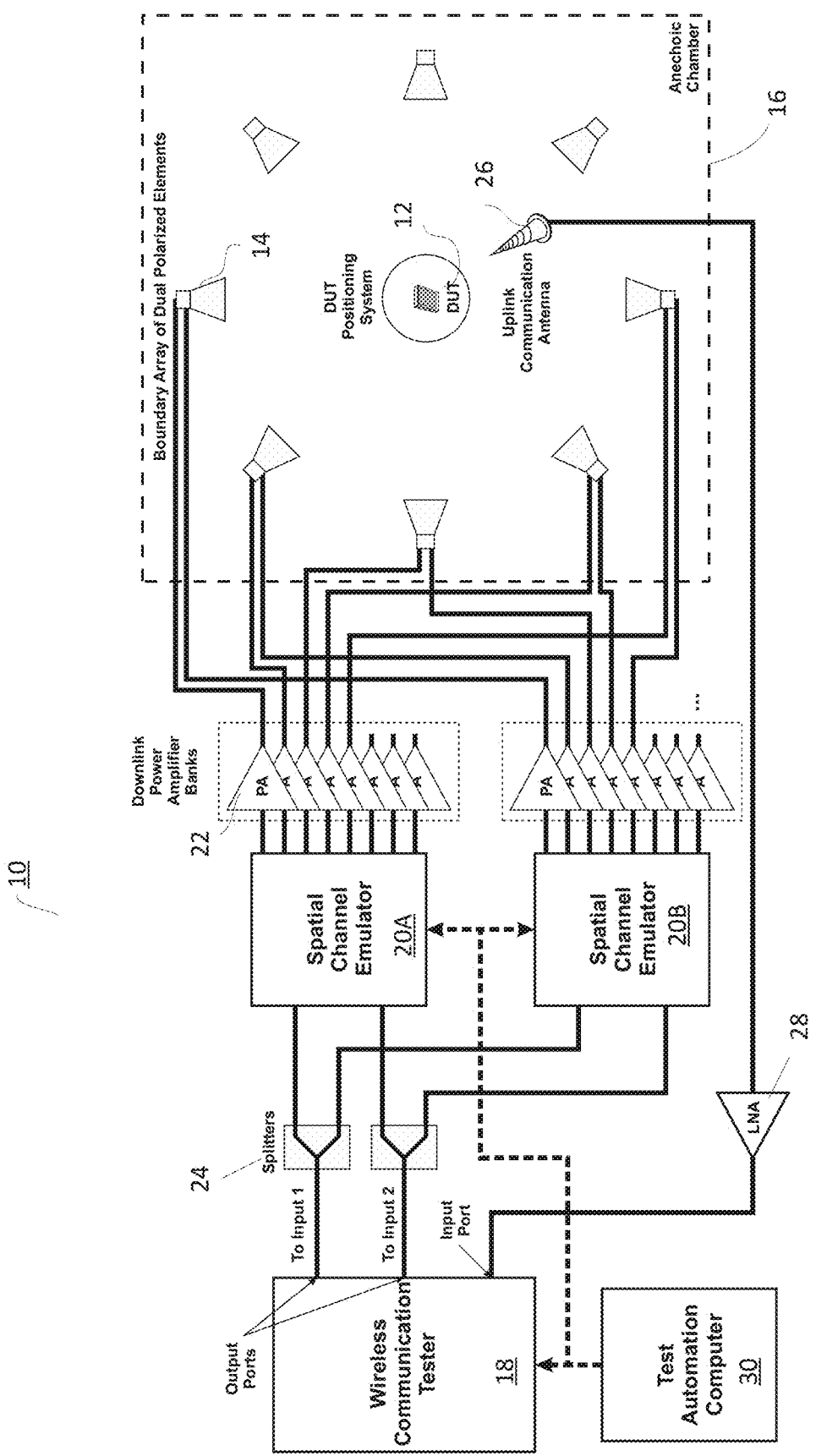
FIG. 1 is a conventional electromagnetic test system.

Before describing in detail exemplary embodiments, it is noted that the embodiments reside primarily in combinations of apparatus components and processing steps related to an improved system and method for power control of an electromagnetic test system such as an over-the-air radio frequency (RF) environment emulator or electromagnetic test system. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements.

Figure 2:
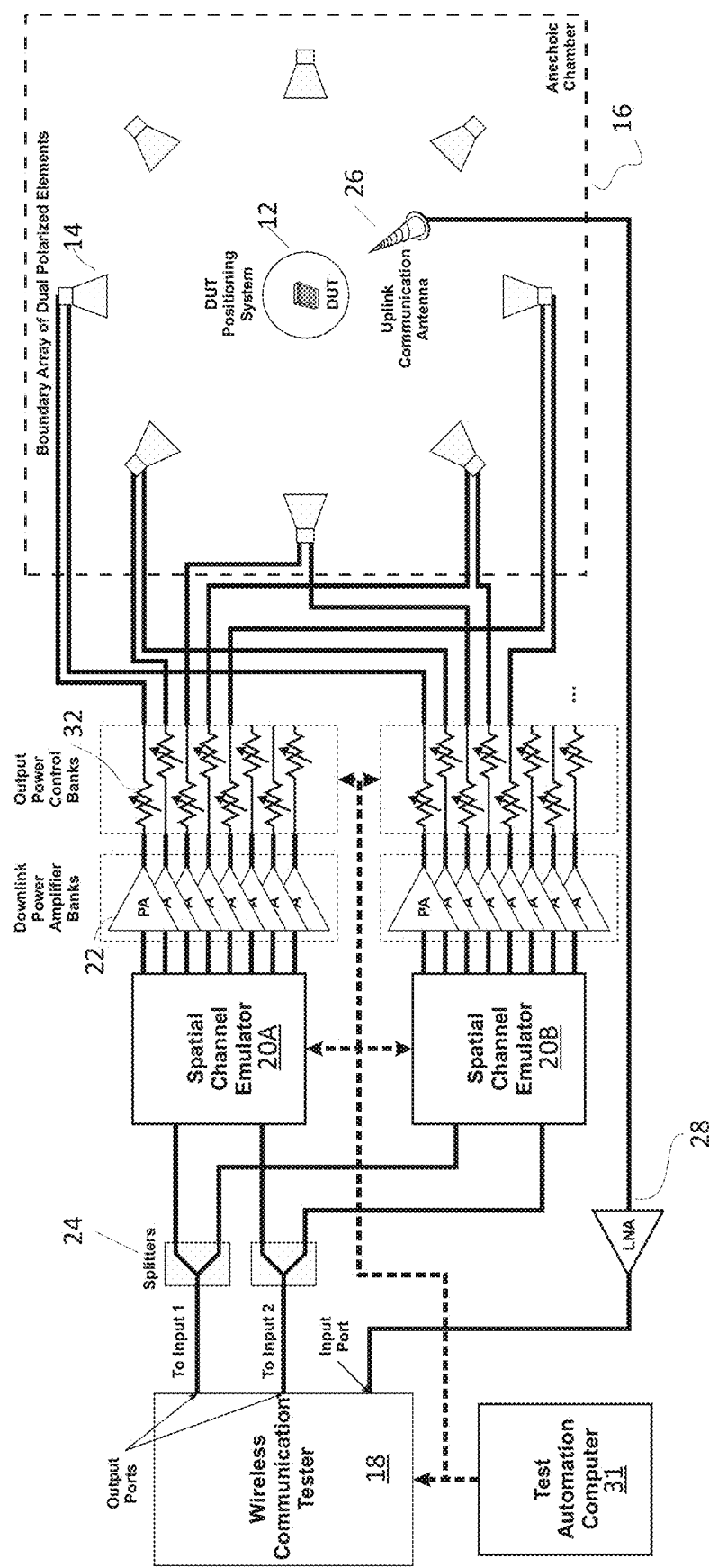
FIG. 2 is an electromagnetic test system configured according to principles set forth below.

In some embodiments, an output power control bank of attenuators 32 are placed at the output of the amplifiers 22, as shown in FIG. 2. For example, an electro-mechanical step attenuator with fixed steps (e.g., 10 dB) may be placed at the output of each amplifier 22. The variable attenuator 32 may be a single off-the-shelf component, or comprised of a series of fixed attenuators and switches to create the desired range of attenuation settings. The attenuator 32 could be controlled in conjunction with the power amplifier 22 and/or the output signal source from spatial channel emulator 20 to ensure that no output power is applied when the attenuator switches, since damage to either the attenuator 32 and/or amplifier 22 might occur while the switches are open circuit. Note that the amplifier output may be disabled by a number of different means, including powering off the amplifier module externally, using an internal disable function that powers down or disconnects one or more internal gain stages, and/or disabling the input signal from the channel emulator output. Thus, the variable attenuator 32 may be adjusted to achieve coarse gain control, while the output power control of the output ports of the channel emulator 20 would then be adjusted over a greatly reduced range (e.g. 0-9.9 dB in 0.1 dB steps) to fill in the fine resolution required for the overall power control.

Thus, an algorithm in the test automation computer 31 would interpret a request for a given power level in the test volume as the need to set an attenuator 32 to a given setting A, disabling and re-enabling the amplifier 22, amplifier output, and/or channel emulator 20 output as needed during that process, and the output level of an output of the channel emulator 20 to an output power B, such that the resultant output power C=B−A corresponds to the requested output level, exclusive of any constant offsets K, such as the amplifier gain and cable losses. Any corrections for net path loss or relative loss at each stage of the attenuator 32 setting may also be applied in the control process to linearize the resulting output power and accurately produce the desired power level in the test volume.

Figure 3:
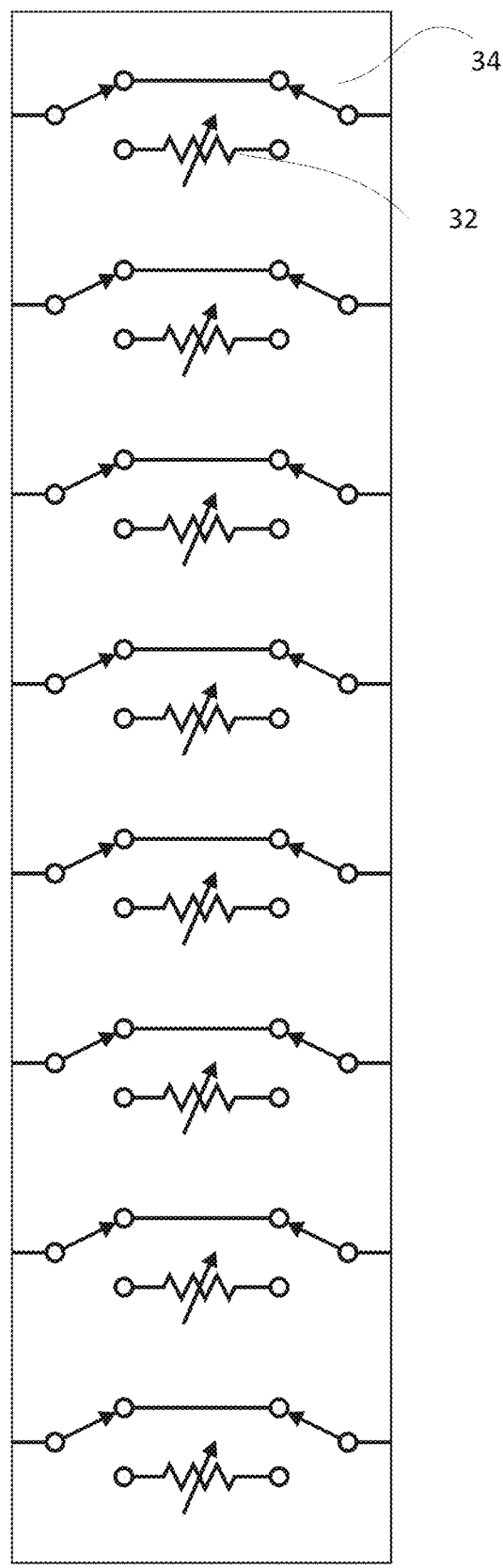
FIG. 3 is an array of variable attenuators with SPDT switches to allow bypassing the attenuators.
Figure 4:
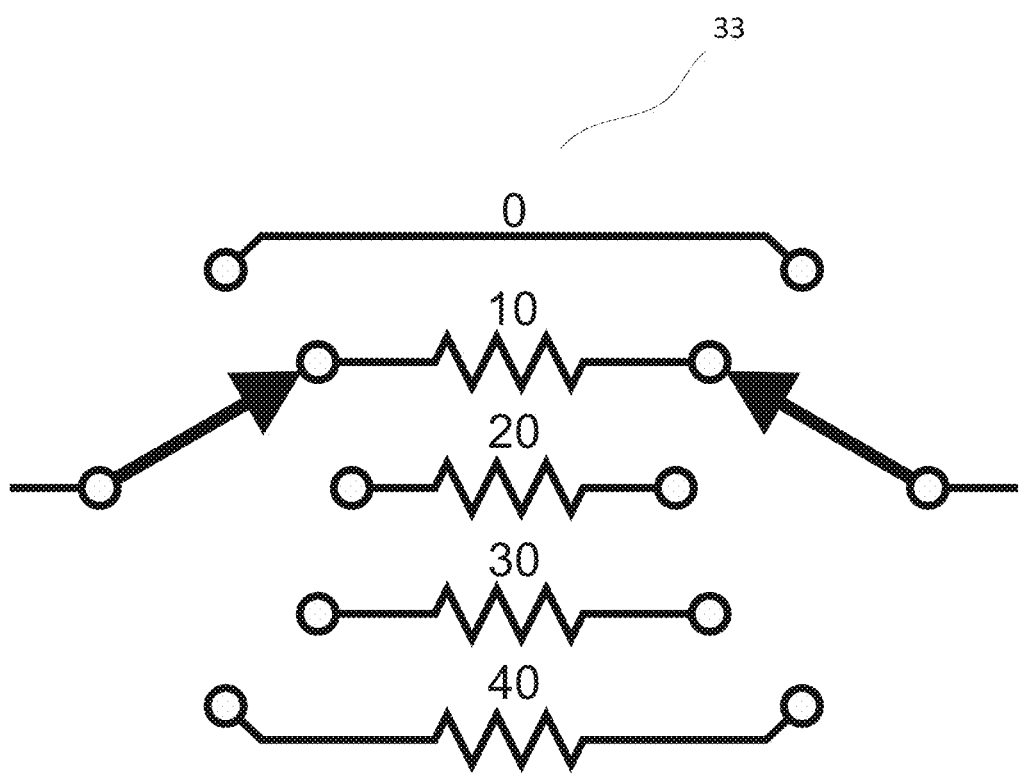
FIG. 4 is a diagram of a step attenuator created from fixed attenuators and multipole switches.

In another embodiment, a digital step attenuator may be used on the output of the amplifier 22. These solid state devices may be subject to a minimum internal loss that usually introduces a minimum insertion loss of 5-10 dB. Thus, in order to avoid losing the maximum output power of the power amplifier (the most expensive part of the amplifier) for signal to interference ratio (SIR) testing, as shown in FIG. 3, a pair of RF switches 34 are used with each attenuator 32 to be able to switch each variable attenuator 32 out of the circuit and bypass the attenuator 32 for full output signal.

In addition, the VSWR of these switches 34 can be quite high, depending on the design, and their maximum power handling capability is typically limited, making them incompatible with a direct connection to the output of high power amplifiers. Thus, additional fixed attenuation may be required to better match the attenuator 32 to the amplifier 22 and avoid damage to either part. This introduces a large step between the maximum power output and the first power level that can be controlled by the variable attenuator 32. While digital attenuators typically have finer step sizes (e.g. down to 0.1 dB resolution is common) such that they may be suitable for the total power control of the sensitivity search, they can only be used when the desired output power is on the order of 10 dB below the maximum output of the amplifier 22, at best.

Thus, a controlling algorithm in the test automation computer 31 described above could use the output level control of the channel emulator 20 up to the point where it would be safe to switch the attenuator 32 into the system. Note that this may be well below the maximum output power of the channel emulator 20, depending on the power handling capability of the attenuator 32. In order to switch the attenuator into or out of the circuit, the amplifier 22 or amplifier output, and/or output of channel emulator 20 may need to be disabled to avoid damage to itself and the switches used to switch the attenuator in or out of the circuit. When the attenuator 32 is switched into the circuit, the algorithm must increase the output level of the channel emulator 20 to compensate for the associated minimum insertion loss of the attenuator 32 (while remaining below the damage level of the attenuator 32), and then system power control may be continued linearly from that point using the digital control of the attenuator 32, or, if necessary depending on the resolution of the digital attenuator 32, combining the attenuator 32 and channel emulator output control as described in the previous embodiment.

A third embodiment would move the attenuation/power control into the amplifier itself, providing a variable gain amplifier design. This may be accomplished, for example, through the use of a digital attenuator or similar power control, either in the main signal path between the earlier gain stages, or in the feedback loop of one of the gain stages. Such an implementation could take into account the impact on the amplifier noise figure. Since attenuating the RF signal earlier in the chain may reduce both the signal and noise from the channel emulator 20 equally, the amplifier 22 may introduce its own noise floor to the resulting signal. If the attenuation is performed too early in the signal chain, the resulting SNR at the output of the amplifier 22 may still be worse than that needed in the test volume. The system level control will be similar to that described above, although in this implementation, the gain of the amplifier can be expected to vary from its maximum value to its minimum in whatever steps are chosen for the power control. Thus, the control algorithm can be expected to be closer to that of the first embodiment, but typically without disabling the amplifier or input signal while changing gain.

In each implementation, frequency dependent corrections for the actual attenuation at each step (i.e. frequency dependent non-linearity) may be applied to improve the overall system accuracy by adjusting the applied attenuation, gain, and/or signal generator settings to compensate for any error in a given target level.

Note that the control and automation of the various components as described above may be centralized in the controlling test software of the test automation computer 31, or distributed among the various embedded components. Multiple attenuators 32 or amplifiers 22 and attenuators 32 may be ganged together in a single output power control module, thereby simplifying overall interface and control. Corrections for the linearity of the variable attenuators 32 as well as any relative offsets between different paths, etc. may be stored in the embedded firmware of an embedded controller of the attenuators or variable gain amplifier bank, either for automatic internal correction or for use by external control software, and used to translate the resulting step settings to the desired quantities for each target frequency, transparent to the user or controlling software.

By moving the power control to the final output stage of the active components of the electromagnetic test system (e.g., the amplifiers 22), the entire signal to noise ratio of the system is kept constant as the signal is attenuated in the test volume. This ensures that regardless of the desired signal level in the test volume, the SNR due to the system should be much better than that due to the inherent platform noise at the DUT receiver. In other words the system noise floor will be well below the DUT platform and receiver noise when the signal is near the receiver sensitivity of the DUT 12.

By keeping the signal from the channel emulator 20 constant, the linearity of the amplifier 22 no longer plays a significant part in the overall system measurement uncertainty, since the average amplifier input and output power remain constant.

Adding the power control/attenuation to the amplifier 22 or after the amplifier 22 also resolves the frequency dependence of the gain and net path loss of the system, allowing the desired net amplifier gain to be adjusted according to the needs of the given frequency dependent path loss. The system amplifier gain can also be tuned to the needs of a specific channel emulator model.

Using the nested power control approach, where the attenuation/gain control at the amplifier output is moved in larger steps and fine control is produced through the channel emulator 20, helps to reduce the overall cost of the added power control components (e.g., attenuators 32) while still keeping the linearity and system SNR contributions at a minimum due to the small dynamic range utilized at the outputs of the channel emulator.

Figure 5:
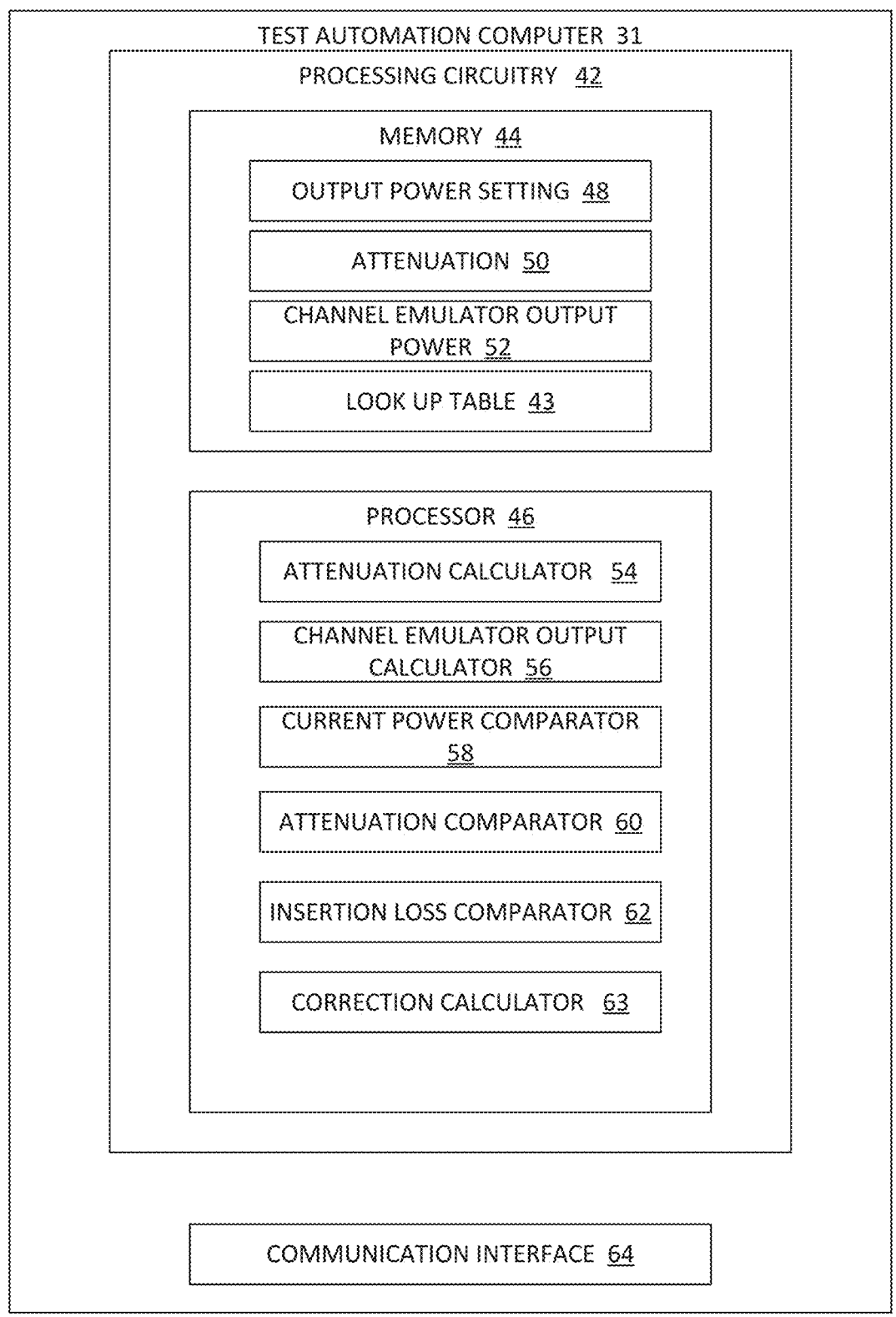
FIG. 5 is a block diagram of a test automation computer constructed according to principles set forth herein.

FIG. 5 is a block diagram of a test automation computer 31 constructed in accordance with principles set forth herein for controlling an output power of an operational path of a electromagnetic test apparatus. The test automation computer 31 has processing circuitry 42. In some embodiments, the processing circuitry may include a memory 44 and processor 46, the memory 44 containing instructions which, when executed by the processor 46, configure processor 46 to perform the one or more functions described herein. In addition to a traditional processor and memory, processing circuitry 42 may comprise integrated circuitry for processing and/or control, e.g., one or more processors and/or processor cores and/or FPGAs (Field Programmable Gate Array) and/or ASICs (Application Specific Integrated Circuits).

Processing circuitry 42 may include and/or be connected to and/or be configured for accessing (e.g., writing to and/or reading from) memory 44, which may include any kind of volatile and/or non-volatile memory, e.g., cache and/or buffer memory and/or RAM (Random Access Memory) and/or ROM (Read-Only Memory) and/or optical memory and/or EPROM (Erasable Programmable Read-Only Memory). Such memory 44 may be configured to store code executable by control circuitry and/or other data, e.g., data pertaining to communication, e.g., configuration and/or address data of nodes, etc. Processing circuitry 42 may be configured to control any of the methods described herein and/or to cause such methods to be performed, e.g., by processor 46. Corresponding instructions may be stored in the memory 44, which may be readable and/or readably connected to the processing circuitry 42. In other words, processing circuitry 42 may include a controller, which may comprise a microprocessor and/or microcontroller and/or FPGA (Field-Programmable Gate Array) device and/or ASIC (Application Specific Integrated Circuit) device. It may be considered that processing circuitry 42 includes or may be connected or connectable to memory, which may be configured to be accessible for reading and/or writing by the controller and/or processing circuitry 42.

The memory 44 is configured to store the target output power setting C, 48, the attenuation setting A, 50, and the channel emulator output power B, 52. These parameters are related according to the following equation.

$$C=B-A'+K$$

where B is less than the maximum power $P_{Max}$, A' is the attenuation setting A plus the insertion loss and/or any residual error in the value of the attenuator, and K is the remaining correction for the gains and losses of amplifiers, cables, antennas, range length, etc. Note that for a power level in the test volume, K is likely to be negative (more path loss than amplifier gain). A may preferably be chosen such that B is the highest possible value less than $P_{Max}$.

In some embodiments, the processor 46 includes a correction calculator 63 configured to determine an actual attenuation for the calculated attenuation from the attenuation calculator 54. The actual attenuation may include residual error (which may include cable losses, etc.) and possibly, attenuator insertion loss. The actual attenuation may be obtained from a look up table 43 that correlates a selected attenuation or attenuation step to an actual attenuation corresponding to that selected attenuation or attenuation step.

Thus, the processor 46 is programmable to implement the following functional modules: attenuation calculator 54, channel emulator output calculator 56, current power comparator 58, attenuation comparator 60, insertion loss comparator 62, and a correction calculator 63. The attenuation calculator 54 is configured to calculate an attenuation setting A and may also be configured to calculate an attenuation step, S, for incrementing the attenuation setting A. The channel emulator output calculator 56 is configured to calculate a channel emulator output power. The current power comparator 58 is configured to compare a target power level X to a current power setting. The attenuation comparator 60 is configured to compare the calculated attenuator setting A to a current attenuation setting. The insertion loss comparator 62 is configured to compare an insertion loss to the calculated attenuation A. The correction calculator 63 is configured to determine an actual attenuation, A', for the calculated attenuation from the attenuation calculator 54.

A communication interface 64 is configured to interface with the channel emulators 20 to set output powers of the channel emulators 20 and to interface with attenuators 32 to set the attenuations of the attenuators 32. Also, when the attenuators 32 are implemented as integral parts of the amplifiers 22, the communication interface 64 is configured to interface with the amplifiers 22.

Figure 6A:
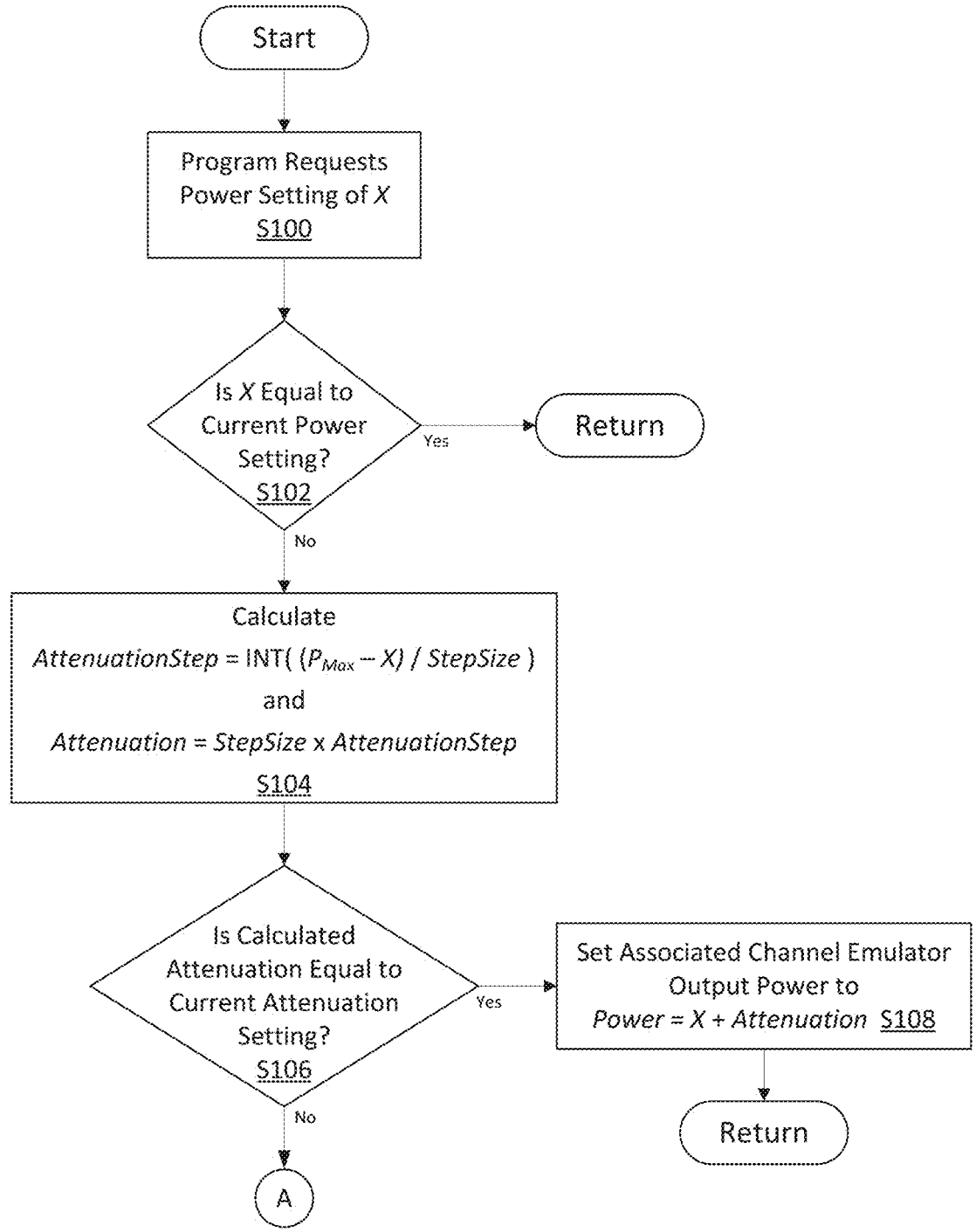
FIG. 6A and FIG. 6B are flowcharts of an exemplary process for selectively setting power of an output of a channel emulator and an attenuator according to principles set forth herein.
Figure 6B:
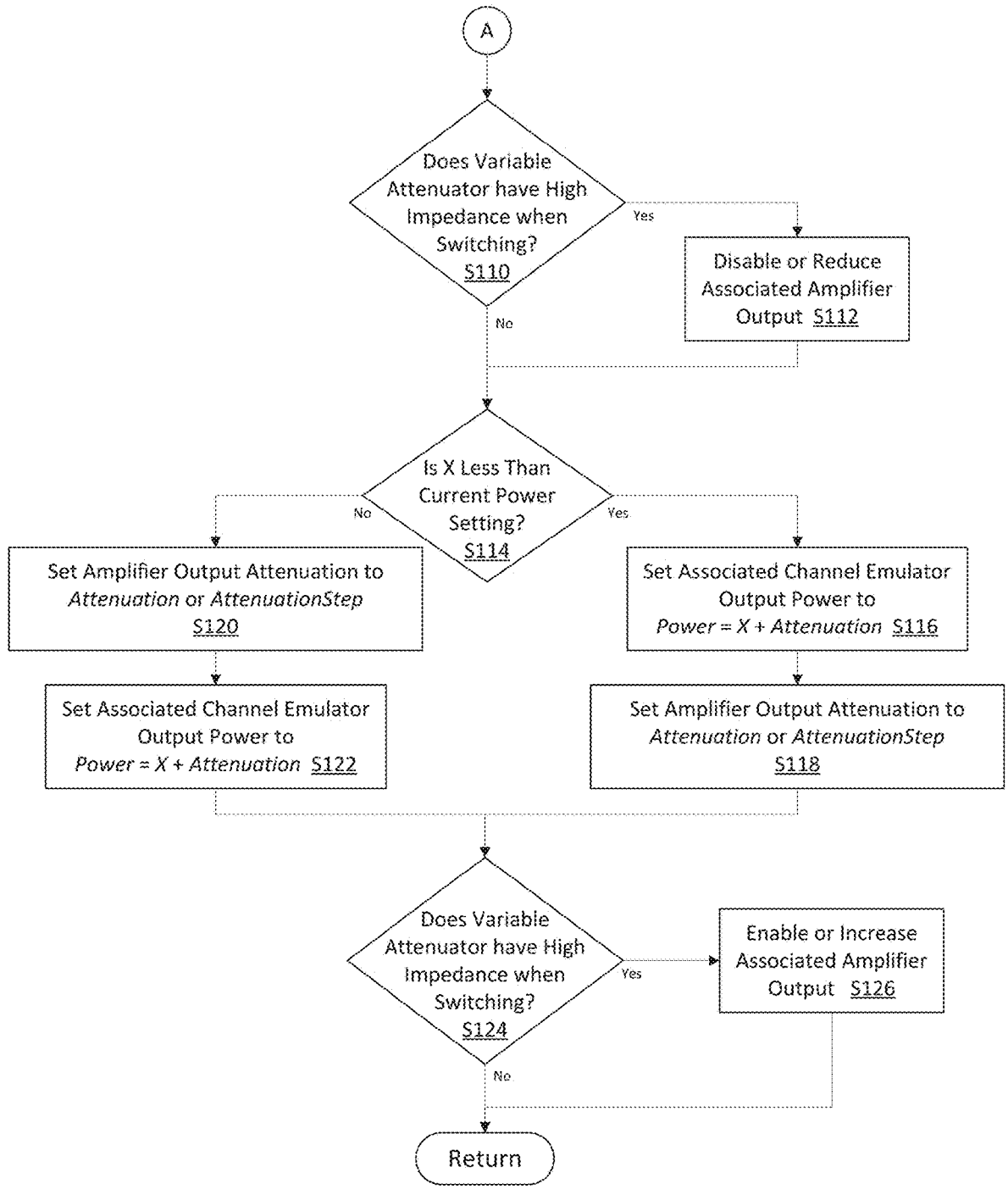

FIGS. 6A and 6B are flowcharts of an exemplary process for selectively setting power of an output of a channel emulator 20 and an attenuator 32 according to principles set forth herein. Starting at the top of FIG. 6A, the process includes receiving a requested power setting, X (block S100). The power setting X is compared, via the current power comparator 58, to the current power setting of that channel of the channel emulator 20 (block S102). If X is equal to the current power setting the process returns. Otherwise, an attenuation step and attenuation are calculated, via the attenuation calculator 54, (block S104), according to:

$$\text{AttenuationStep}=\text{INT}((P_{Max}-X)/\text{StepSize})$$

and $$\text{Attenuation}=\text{StepSize}\times\text{AttenuationStep}$$

Next, the calculated attenuation or attenuation step setting is compared, via the attenuation comparator 60, to the current attenuation/step setting (block S106). If the calculated attenuation is equal to the current attenuation setting, then the output power of an output of the channel emulator 20 is set to X plus the calculated or current attenuation (block S108). Otherwise, the process proceeds to block S110 of FIG. 6B. If the variable attenuator 32 has a high impedance when switching, (block S110), the output of the amplifier 22 preceding the attenuator 32 is disabled or reduced (block S112). This may be done as described above. For example, the amplifier 22 output may be disabled by a number of different means, including powering off the amplifier module externally, using an internal disable function that powers down or disconnects one or more internal gain stages, and/or disabling the input signal from the channel emulator output. In the alternative to disabling the output power of the amplifier, the amplifier output can be reduced to a level that will prevent damage into a high impedance or open circuit, such as, by reducing the output of the channel emulator that is input to the amplifier.

The decision in block S114 and the subsequent steps may be used to control the order of setting of the channel emulator output power to keep the power from falling below the target level while switching. This may be desirable, for example, to prevent the loss of wireless communication during the adjustment. If the requested power setting X is less than the current power setting (block S114), then the output power of the output of the channel emulator 20 may be set to X plus the calculated attenuation via the channel emulator output calculator 56 (block S116). Subsequently, the amplifier output attenuation is set to the calculated attenuation or the attenuation step, as applicable (block S118). In particular, if the attenuator is set by step number, then the step number is used to set the attenuation. If the attenuator is set by attenuation value, then the attenuation value is specified.

If the requested power setting, X, is greater than the current power setting (block S114) then the amplifier output attenuation is set to the calculated attenuation or the attenuation step (block S120). Subsequently, the output power of the associated channel emulator output is set to X plus the calculated attenuation (block S122). From block S118 or S122, the process continues to block S124 where, if the variable attenuator has a high impedance when switching, the associated amplifier output is enabled or increased (block S126). The process then ends. Note that this entire algorithm may be performed in series or in parallel for the channels, (e.g., the same attenuation setting for all outputs for a net power control of the entire system.) However, the series approach offers several distinct advantages, including the ability to compensate for the relative power variation at each output (due to the cluster arrangement of the chosen model) in the output attenuators rather than at the channel emulator output, thereby improving the SNR of all outputs to the maximum possible. The sequential enabling and disabling of the outputs/amplifiers one at a time also ensure that the remaining outputs are still generating signals at the DUT, reducing the likelihood of lost communication connections and dropped calls.

Figure 7A:
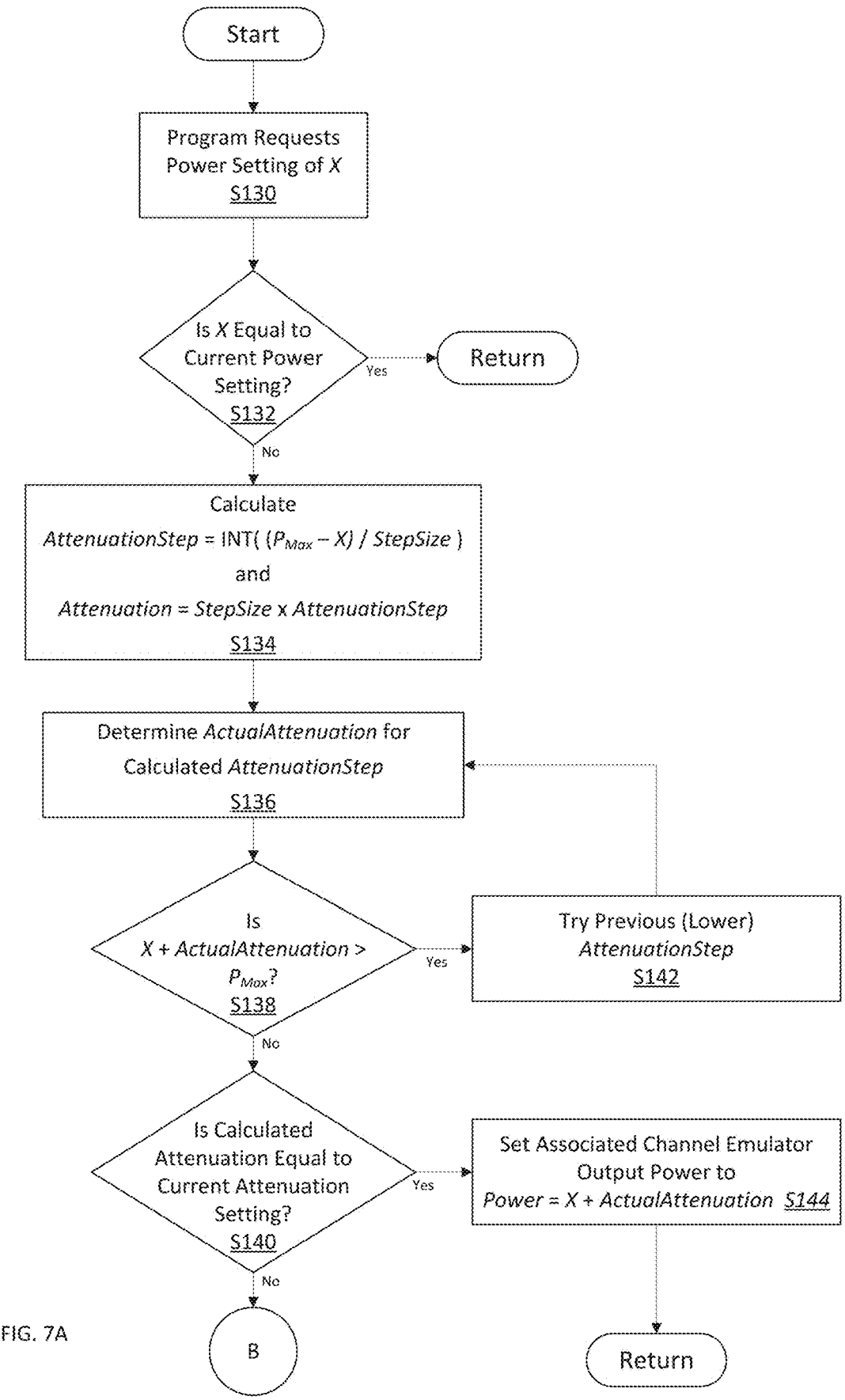
FIGS. 7A, 7B and 7C are flowcharts of an exemplary process for selectively setting power of an output of a channel emulator and an attenuator with error correction according to principles set forth herein.
Figure 7B:
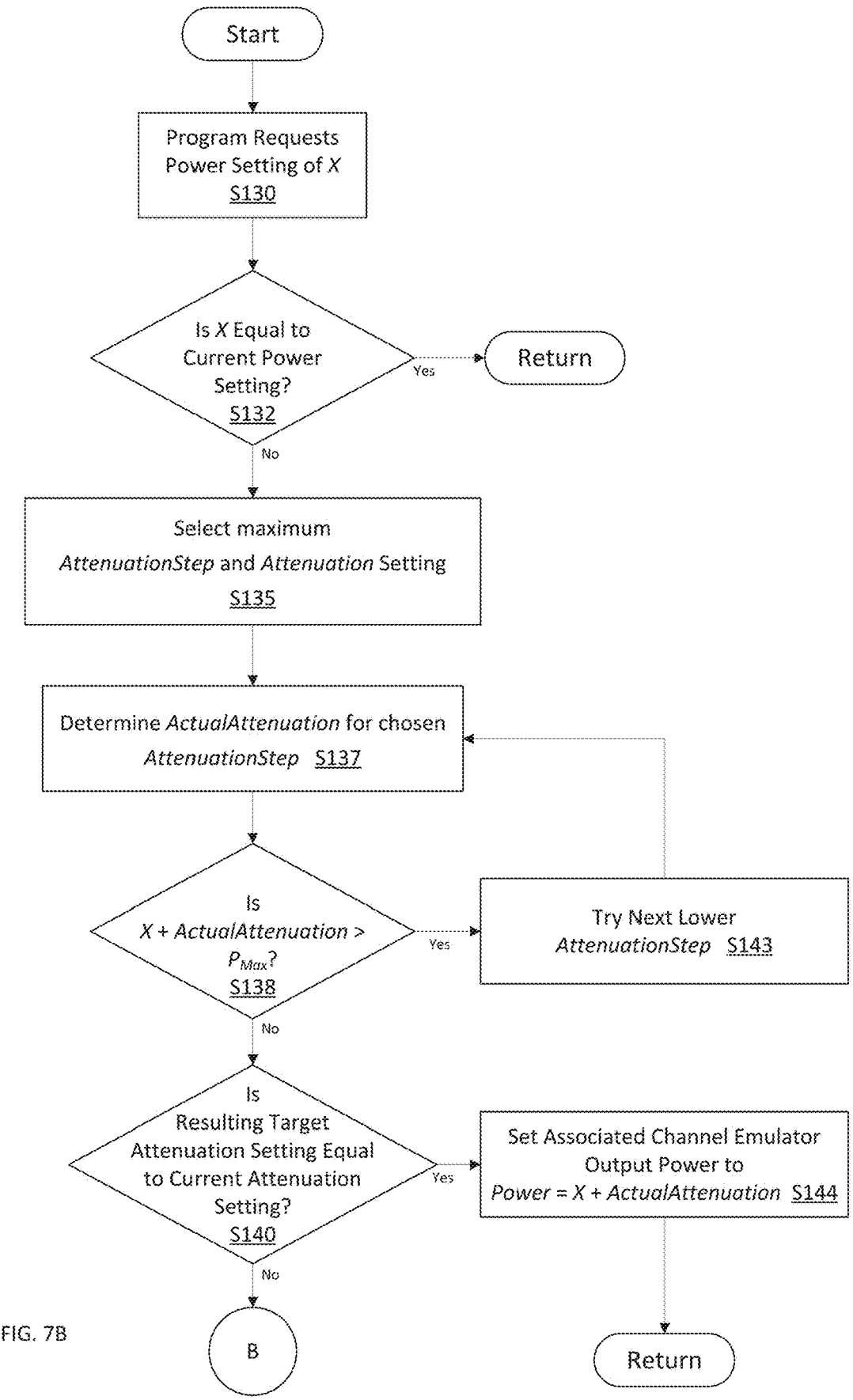
Figure 7C:
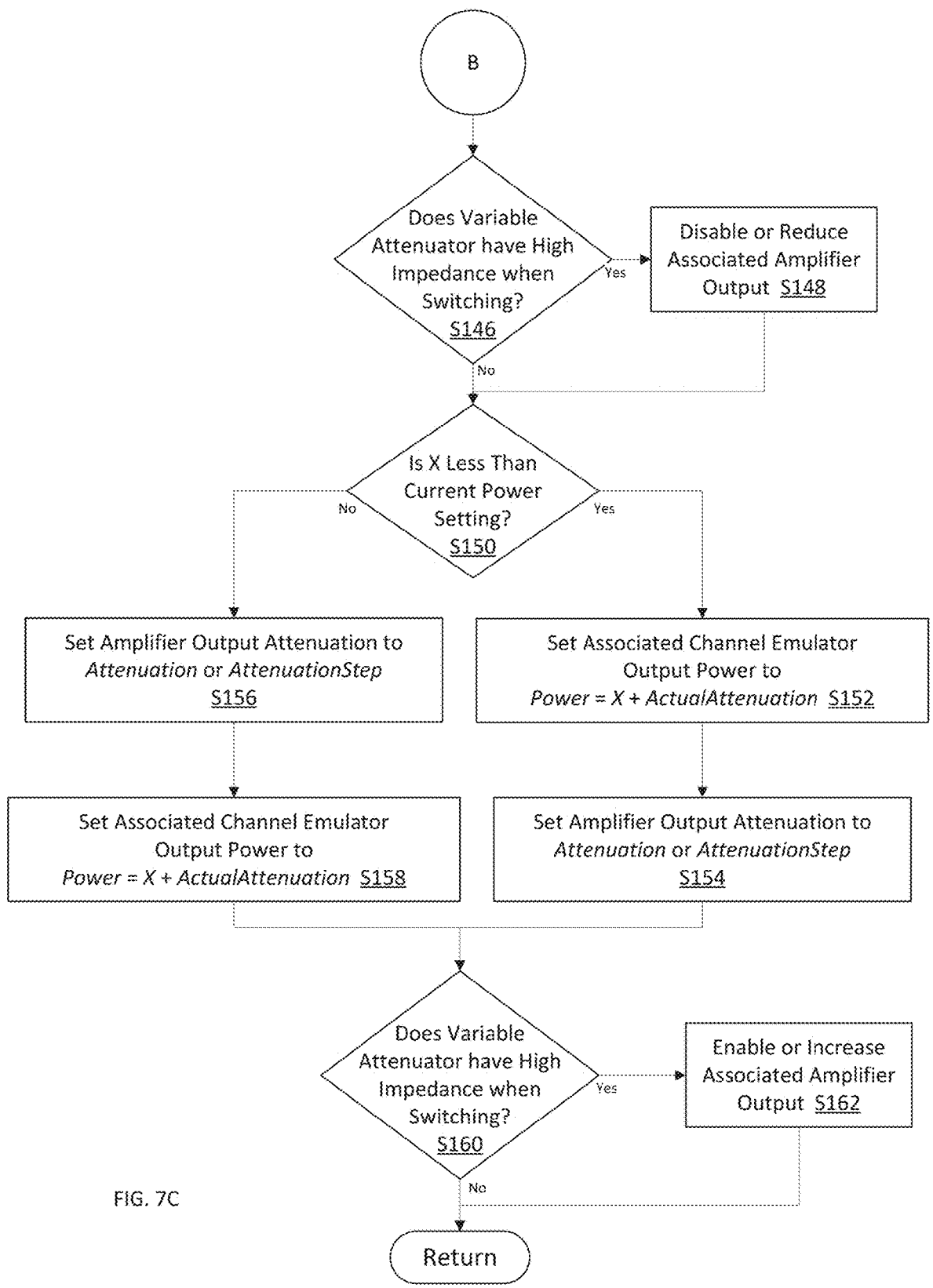

FIGS. 7A, 7B and 7C are flowcharts of an exemplary process for selectively setting power of an output of a channel emulator 20 and an attenuator 32 with error correction according to principles set forth herein. Starting at the top of FIG. 7A, the process includes receiving a requested power setting, X (block S130). The power setting X is compared, via the current power comparator 58, to the current power setting (block S132). If X is equal to the current power setting the process returns. Otherwise, an attenuation step and attenuation are calculated via the attenuation calculator 54 (block S134) according to:

$$AttenuationStep=INT((P_{Max}-X)/StepSize)$$

and $$Attenuation=StepSize \times AttenuationStep$$

where $P_{Max}$ is the maximum output power of the channel emulator output.

The process includes determining an actual attenuation for the calculated attenuation step (block S136). The actual attenuation may include residual error (which may include cable losses, etc.) and possibly, attenuator insertion loss. The actual attenuation may be obtained from a look up table that correlates a selected attenuation or attenuation step to an actual attenuation corresponding to that selected attenuation or attenuation step. Once the actual attenuation is determined, a comparison is made to determine if the requested power setting X plus the actual attenuation is greater than the maximum channel emulator output power $P_{Max}$ (block S138). If so, a previous (lower) attenuation step is used (block S142) to determine the actual attenuation (block S136). If not, the process includes determining if the calculated attenuation is equal to the current attenuation setting (block S140). If so then the associated channel emulator output power is set to X plus the actual attenuation (block S144) and the process returns. Otherwise, the process continues to block S130 reproduced in FIG. 7B.

In FIG. 7B, in block S130, the program requests a power setting X. If X is equal to the current power setting, the process returns. Otherwise, a maximum attenuation step and attenuation setting are selected (block S135). Then an actual attenuation is chosen for the selected attenuation step (block S137). A determination is made whether the requested power setting plus actual attenuation exceeds the maximum output power, $P_{Max}$, of the channel emulator (block S138). If so, a next lower attenuation step is chosen (block S143) and a new actual attenuation value is obtained corresponding to the next lower attenuation step (block S137). If X plus the actual attenuation is not greater than $P_{Max}$ (block S138), then a determination is made whether the resulting target attenuation setting is equal to the current attenuation setting (block S140). If so, then the associated channel emulator output power is set to X plus the actual attenuation (block S144). Otherwise, the process continues to block S146 of FIG. 7C.

If the variable attenuator 32 has a high impedance when switching, (block S146), the output of the amplifier 22 preceding the attenuator 32 is disabled or its output is otherwise reduced, (block S148) and the process continues.

If the requested power setting X is less than the current power setting (block S150), then the output power of the output of the channel emulator 20 is set to X plus the calculated attenuation plus the calculated error correction (block S152). Subsequently, the amplifier output attenuation is set to the calculated attenuation or the attenuation step (block S154).

If the requested power setting X is greater than the current power setting (block S150) then the amplifier output attenuation is set to the calculated attenuation or the attenuation step (block S156). Subsequently, the output power of the associated channel emulator output is set to X plus the calculated attenuation plus the calculated error correction (block S158). From block S154 or S158, the process continues to block S160 where, if the variable attenuator has a high impedance when switching, the associated amplifier output is enabled or increased (block S158). The process then returns.

Figure 8:
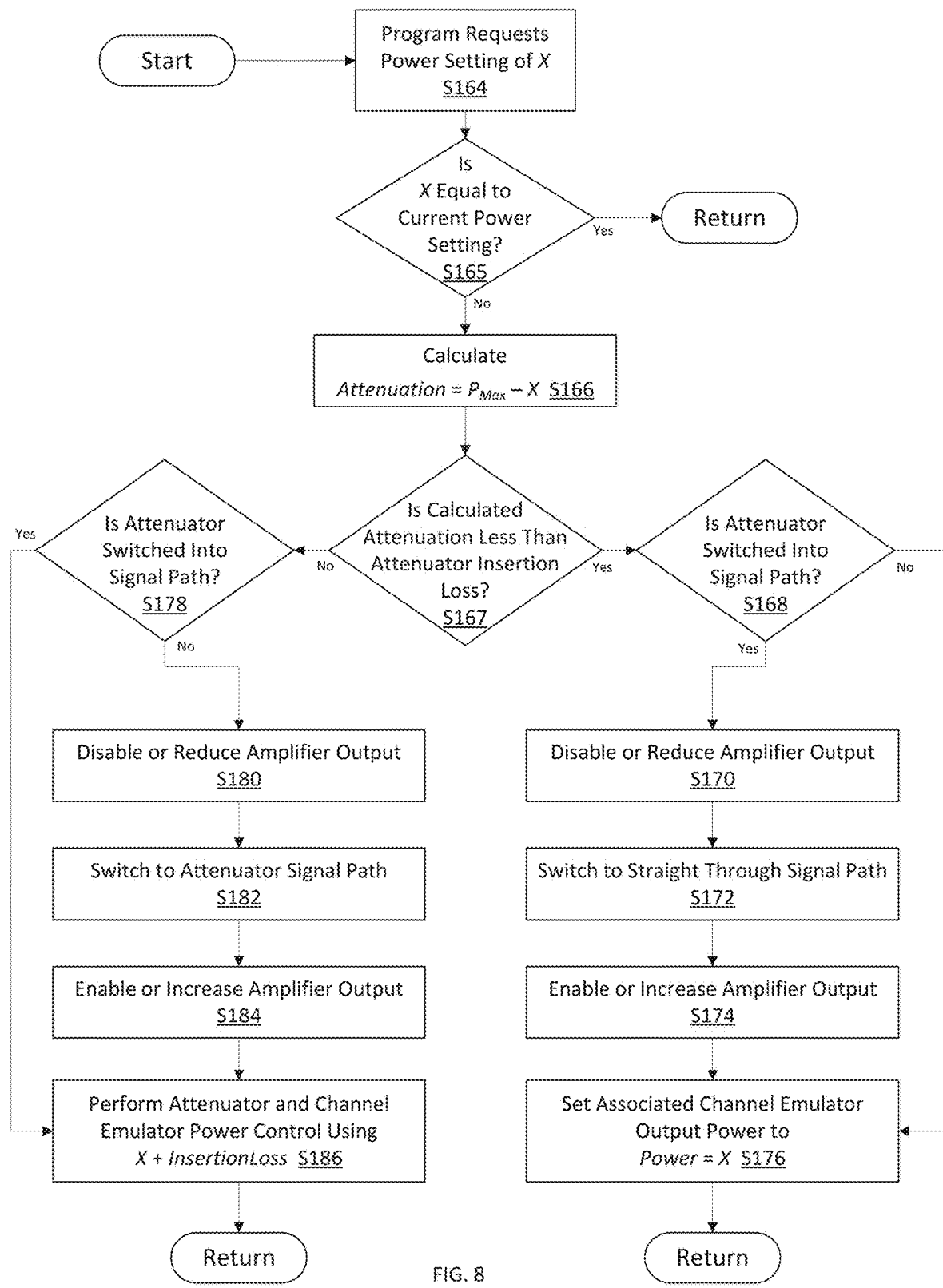
FIG. 8 is a flowchart of an exemplary process for selectively setting power of an output of a channel emulator and an attenuator, accounting for insertion loss of the attenuator according to principles set forth herein.

FIG. 8 is a flowchart of an exemplary process for selectively setting power of an output of a channel emulator 20 and an attenuator 32, accounting for insertion loss of the attenuator according to principles set forth herein. The process includes receiving a requested power setting, X (block S164). The power setting X is compared to the current power setting via the current power comparator 60 (block S165). If X is equal to the current power setting, the process returns. Otherwise, an attenuation is calculated (block S166) according to:

$$Attenuation=P_{Max}-X$$

where $P_{Max}$ is the maximum power output of the channel emulator output.

A comparison is between the calculated attenuation and the attenuator insertion loss via the insertion loss comparator 62 (block S167). If the calculated attenuation is less than the attenuator insertion loss, then the process continues to block S168. At block S168, a determination is made whether the attenuator is switched into the signal path. If so, the process continues to block S170, and if not, the process continues at block S176. At block S170, the amplifier output is disabled or reduced as described above, by, for example, reducing the output power of the emulator output that is input to the amplifier. A switch 34 in the path of the attenuator 32 is set to a straight through signal path, bypassing the attenuator 32 (block 172). The amplifier 22 output is enabled or increased (block S174). Then, the output power of the associated channel emulator output is set to X (block S176) and the process ends.

Returning to block S166, if the calculated attenuation is not less than the attenuator insertion loss, the process continues at block S178 where it is determined whether the attenuator is switched into the signal path. If so, the process continues at block S186. Otherwise, the amplifier output is disabled or reduced (block S180), the switch 34 selects the attenuator path (block S182) and the amplifier 22 output is enabled or increased (block S184). Then the attenuator 32 and channel emulator 20 power control is set using X, the process of FIGS. 5A and 5B or FIGS. 6A and 6B), substituting X plus the insertion loss for X (block S186).

In some embodiments, the processes of the flowcharts of FIGS. 6-8 may be implemented by software modules executed by the processor 46. In some embodiments, the enabling of the amplifier (S174/S184) may be delayed until the final steps of adjusting the attenuator (S176/S186).

Figure 9:
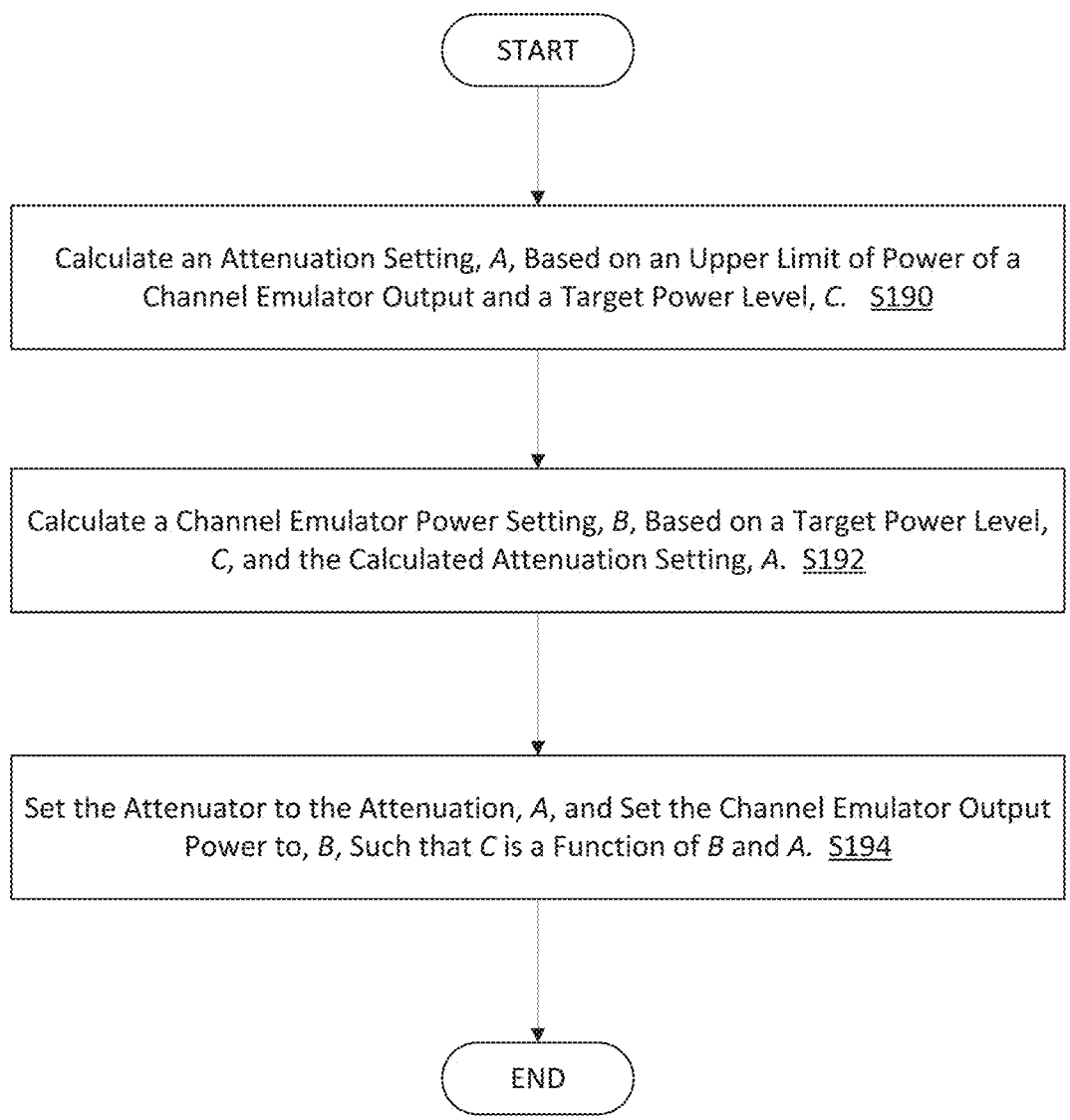
FIG. 9 is a flowchart of an exemplary process for setting attenuation and channel emulator output power.

FIG. 9 is a flowchart of an exemplary process for implementing power control in an electromagnetic test system. The process includes calculating, via the attenuation calculator 54, an attenuation setting A based on an upper limit of power of a channel emulator output and the target power level C (block S190). The process also includes calculating, via the channel emulator output calculator 56, a channel emulator power setting B based on a target power level C and the calculated attenuation setting A (block S192). The process further includes setting the attenuator to the attenuation A and setting the channel emulator output power to B, such that C is a function of B and A (block S194).

Thus, in some embodiments, a method of controlling power in an electromagnetic test system is provided, where the electromagnetic test system has at least one operational path having a channel emulator output, an amplifier 22 and an attenuator 32 (or a variable gain amplifier), and an antenna 14. The method includes, for a given desired output power level, C, setting a channel emulator output power to a power level B, and setting the attenuator 32 to a setting A, such that C is a function of B and A. In such embodiments, the attenuation A is calculated based on an upper limit output power of the channel emulator 20. The upper limit output power of the channel emulator 20 may be the maximum output power of the channel emulator 20 or the maximum desired or required output power level of a given channel emulator 20 output port for a given channel model or mode of operation.

In some embodiments, B is offset from C plus A by a constant that includes the insertion loss of the attenuator 32. In some embodiments, a sequence in which the setting of the channel emulator output power level B and the setting of the attenuator setting A are made depends upon whether the desired output power level C is less than a current output power level. In some embodiments, the amplifier 22 output is disabled during a setting of the attenuator 32 and channel emulator output power. As explained above, there are several ways to disable or reduce the amplifier output such as powering off the amplifier 22, reducing the gain of the amplifier, internally disabling an RF connection or gain stage within the amplifier 22, turning off the output of the channel emulator 20, etc. In some embodiments, a setting of the attenuation A is calculated to reduce a range over which the channel emulator output power is adjusted to achieve the desired output power level. In some embodiments, the channel emulator output power B is further adjusted to compensate for an insertion loss of the attenuator 32. In some embodiments, the channel emulator output power B is further adjusted to compensate for a residual error arising from the determination of the attenuation value A. In some embodiments, the attenuation setting A is based on a difference between a maximum output power of the channel emulator output and the target power level, C. Note that in some embodiments, attenuation setting A may further take in to account cable and range losses and amplifier gains, as explained above.

In some embodiments, a method of controlling power in an electromagnetic test system is provided, where the electromagnetic test system has at least one operational path having a channel emulator output, an amplifier 22, an attenuator 32 (or a variable gain amplifier) and an antenna 14. The method includes determining a target power level, C, to be delivered by an antenna 14 to a test volume. The method also includes determining an attenuation value A based on the target power level, C. When the determined attenuation value A differs from a previously set attenuation value, then one of the following two steps is taken: (1) if C is less than a current power level output by the antenna 14, adjust the channel emulator output power to B and then set attenuation of the attenuator to A, where B is a function of C+A, or (2) if C is greater than the current power level, set attenuation of the attenuator 32 to A and then adjust the channel emulator output power to B, where B is a function of C+A.

In some embodiments, B is offset from C plus A by a constant that includes the insertion loss of the attenuator 32. For example, a digital attenuator has a total attenuation given by A'=A+I, where A is the attenuation setting and I is the insertion loss of the attenuator so that B is offset from C plus A by an amount that includes I. In some embodiments, a sequence in which the setting of the channel emulator output power level B and the setting of the attenuator setting A are made depends upon whether the desired output power level C is less than a current output power level. In some embodiments, the amplifier 22 output is disabled during a setting of the attenuator 32 and channel emulator output power. In some embodiments, a setting of the attenuation A is calculated to reduce a range over which the channel emulator output power is adjusted to achieve the desired output power level. In some embodiments, B is further adjusted to compensate for insertion loss of the attenuator 32. In some embodiments, B is further adjusted to compensate for a residual error arising from the determination of the actual attenuation value A. In some embodiments, the attenuation value A is based on a difference between an upper limit output power of the channel emulator output and the target power level, C. In some embodiments, the method further includes disabling the amplifier output prior to setting the attenuation of the attenuator to A and re-enabling the amplifier output after setting the attenuation of the attenuator to A. In some embodiments, when the determined attenuation value A equals a previously set attenuation value, the channel emulator output power is set to B, where B is a function of C+A.

Some embodiments include an electromagnetic test system having at least one operational path having a channel emulator output, an amplifier 22, an attenuator 32 and an antenna 14. The electromagnetic test system also includes a controller 31 that is configured to control an output power C of an operational path of the electromagnetic test system by setting the attenuator 32 to an attenuation value A and setting the channel emulator output to a value B. A and B are such that A is a function of a predetermined upper output power limit of the channel emulator 20 and the desired output power C, and B is a function of the sum of C and A. Note that attenuation A is a positive number.

In some embodiments, the electromagnetic test system further includes a switch 34 to switch the attenuator 32 out of the circuit to remove the corresponding insertion loss. In some embodiments, the attenuator 32 is an electro-mechanical step attenuator with fixed steps. In some embodiments, the attenuator 32 is a digital step attenuator. In some embodiments, the attenuator 32 is a voltage controlled or voltage variable attenuator.

In some embodiments, a test automation computer 31 for controlling power and attenuation in an electromagnetic test system is provided. The test automation computer 31 includes a memory 44 and a processor 46. The memory 44 is configured to store a target output power C, an attenuation A and a channel emulator output power B. The processor 46 is in communication with the memory 44 and configured to: control an output power C of an operational path of the electromagnetic test system by setting an attenuator 32 to an attenuation value A and setting a channel emulator output to a value B, such that A is a function of a predetermined upper output power limit of the channel emulator 20 and the target power C, and B is a function of the sum of C and A. Note that as used herein, the values of B, C and A may be measured and/or expressed in decibels.

Abbreviation—Explanation

DUT—Device Under Test
RF—Radio Frequency
LNA—Low Noise Amplifier
PA—Power Amplifier
VGA—Variable Gain Amplifier
AMP—Amplifier
TX—Transmit
RX—Receive
OTA—Over-the-Air
INR—Interference-to-Noise Ratio
SIR—Signal-to-Interference Ratio
SINR—Signal-to-Interference-plus-Noise Ratio
SNR—Signal-to-Noise Ratio
MCS—Modulation and Coding Scheme As will be appreciated by one of skill in the art, some of the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices such as flash, EPROM, EEPROM, etc., optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. The blocks of the flowcharts may also be implemented in pure logic circuits such as Field Programmable Gate Arrays, or in application specific integrated circuits.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language, or a scripting language such as Python, PHP, or Perl. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings.

The invention claimed is:

1. A method of controlling power in an electromagnetic test system, the electromagnetic test system having at least one operational path having a channel emulator output, at least one of an amplifier/attenuator combination and a variable gain amplifier, VGA, and an antenna, the method comprising:

for a given desired output power level, C, setting a channel emulator output power to a power level B, and setting one of the attenuator and the VGA to achieve an attenuation setting A, such that C is a function of B and A;

the attenuation setting A being calculated based on an upper limit output power of the channel emulator and the desired output power level C.

2. The method of claim 1, wherein C is offset from B minus A by a constant that includes an insertion loss of the attenuator.

3. The method of claim 1, wherein a sequence in which the setting of the channel emulator output power level B and the setting of the attenuation setting A are made depends upon whether the desired output power level C is less than a current output power level.

4. The method of claim 1, wherein the amplifier output is one of disabled and reduced during a setting of the attenuation setting A and channel emulator output power B.

5. The method of claim 1, wherein a setting of the attenuation setting A is calculated to reduce a range over which the channel emulator output power, B, is adjusted to achieve the desired output power level.

6. The method of claim 1, wherein at least one of the channel emulator output power B and attenuation setting A are further adjusted to compensate for an insertion loss of the attenuator.

7. The method of claim 1, wherein at least one of the channel emulator output power B and attenuation setting A is further adjusted to compensate for a residual error arising from the determination of the attenuation setting A.

8. The method of claim 1, wherein the attenuation setting A is based on a difference between a maximum output power of the channel emulator output, $P_{Max}$, and the target power level, C.

9. A method of controlling power in an electromagnetic test system, the electromagnetic test system having at least one operational path having a channel emulator output, one of an amplifier/attenuator combination and a variable gain amplifier, VGA, and an antenna, the method comprising:
determining a target power level, C, to be delivered by an antenna to a test volume;
determining an attenuation value A based on the target power level, C; and
when the determined attenuation value A differs from a previously set attenuation value, then:
if C is less than a current power level output by the antenna, adjust the channel emulator output power to B and then set one of the attenuator and the VGA to achieve an attenuation value A, where B is a function of C plus A; and
if C is greater than the current power level, set the attenuation value A and then adjust the channel emulator output power to B, where B is a function of C plus A.

10. The method of claim 9, wherein C is offset from B minus A by a constant that includes the insertion loss of the attenuator.

11. The method of claim 9, wherein the amplifier is one of disabled and reduced during a setting of the attenuation value A and channel emulator output power B.

12. The method of claim 9, wherein a setting of the attenuation value A is calculated to reduce a range over which the channel emulator output power B is adjusted to achieve the desired output power level.

13. The method of claim 9, wherein at least one of B and A are further adjusted to compensate for insertion loss of the attenuator.

14. The method of claim 9, wherein at least one of the channel emulator output power B and attenuation setting A is further adjusted to compensate for a residual error arising from the determination of the attenuation setting A.

15. The method of claim 9, wherein the attenuation value A is based on a difference between an upper limit output power of the channel emulator output, $P_{max}$, and the target power level, C.

16. The method of claim 9, further comprising one of disabling and reducing the amplifier prior to setting the attenuation value A and re-enabling the amplifier after setting the attenuation value A.

17. The method of claim 9, wherein, when the determined attenuation value A equals a previously set attenuation value, adjust the channel emulator output power to B, where B is a function of C plus A.

18. An electromagnetic test system having at least one operational path having a channel emulator output, one of an amplifier/attenuator combination and a variable gain amplifier, VGA, and an antenna, comprising:
a controller configured to:
control an output power C of an operational path of the electromagnetic test system by setting one of the attenuator and the VGA to achieve an attenuation value A; and
setting the channel emulator output to a value B, such that A is a function of a predetermined upper output power limit of the channel emulator and the target power level C, and B is a function of the sum of C and A.

19. The electromagnetic test system of claim 18, further comprising a switch to switch the attenuator out of the circuit during adjustment.

20. The electromagnetic test system of claim 18, wherein the attenuator is a step attenuator with fixed steps.

21. A test automation computer for controlling power and attenuation in an electromagnetic test system, comprising:
a memory configured to store a target output power C, an attenuation A, and a channel emulator output power B; and
a processor in communication with the memory and configured to:
control an output power C of an operational path of the electromagnetic test system by setting one of an attenuator and a variable gain amplifier, VGA, to achieve an attenuation value A and setting a channel emulator output to a value B, such that A is a function of a predetermined upper output power limit of the channel emulator and the target power level C, and B is a function of the sum of C and A.

* * * * *